(12) United States Patent
Schep et al.

(10) Patent No.: US 7,110,332 B2
(45) Date of Patent: Sep. 19, 2006

(54) RECORD CARRIER HAVING A SERVO TRACK WITH POSITION INFORMATION IN ACCORDANCE WITH A MODULATION TYPE AND PERMANENT INFORMATION IN ACCORDANCE WITH A DIFFERENT MODULATION TYPE, AND APPARATUS FOR SCANNING THE RECORD CARRIER

(75) Inventors: Cornelis Marinus Schep, Eindhoven (NL); Aalbert Stek, Eindhoven (NL); Jacobus Petrus Josephus Heemskerk, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 817 days.

(21) Appl. No.: 10/268,418

(22) Filed: Oct. 10, 2002

(65) Prior Publication Data
US 2003/0090977 A1     May 15, 2003

(30) Foreign Application Priority Data
Oct. 15, 2001    (EP) ................................. 01203882

(51) Int. Cl.
*G11B 15/52*    (2006.01)
(52) U.S. Cl. .............................. 369/47.19; 369/275.3; 369/275.4
(58) Field of Classification Search ...................... None
See application file for complete search history.

(56) References Cited

U.S. PATENT DOCUMENTS

| | | | |
|---|---|---|---|
| 5,835,478 A * | 11/1998 | Kobayashi et al. ...... | 369/275.3 |
| 5,930,210 A | 7/1999 | Timmermans et al. ... | 369/44.13 |
| 6,122,739 A * | 9/2000 | Kutaragi et al. ............... | 726/32 |
| 6,538,982 B1 | 3/2003 | Van Vlerken et al. | |
| 6,765,861 B1 | 7/2004 | Van Vlerken et al. | |
| 6,996,042 B1 * | 2/2006 | Kobayashi ............... | 369/47.51 |
| 2001/0005357 A1 | 6/2001 | Ha et al. ................. | 369/275.4 |

FOREIGN PATENT DOCUMENTS

| | | |
|---|---|---|
| EP | 0723216 A2 | 7/1996 |
| WO | WO0219332 | 7/2002 |

* cited by examiner

*Primary Examiner*—Paul W. Huber

(57) ABSTRACT

A record carrier (1) has a servo track (4) indicating an information track (9) intended for recording information blocks. The servo track (4) has a periodic variation of a physical parameter at a predetermined frequency, usually called wobble. The servo track has modulated parts for encoding position information according to a predetermined type of modulation. The record carrier includes a management area in which the servo track includes permanent data. The permanent data is encoded using a different type of modulation, but using the variations of the same physical parameter. Direct digital modulation (41) is proposed for the different type of modulation.

10 Claims, 4 Drawing Sheets

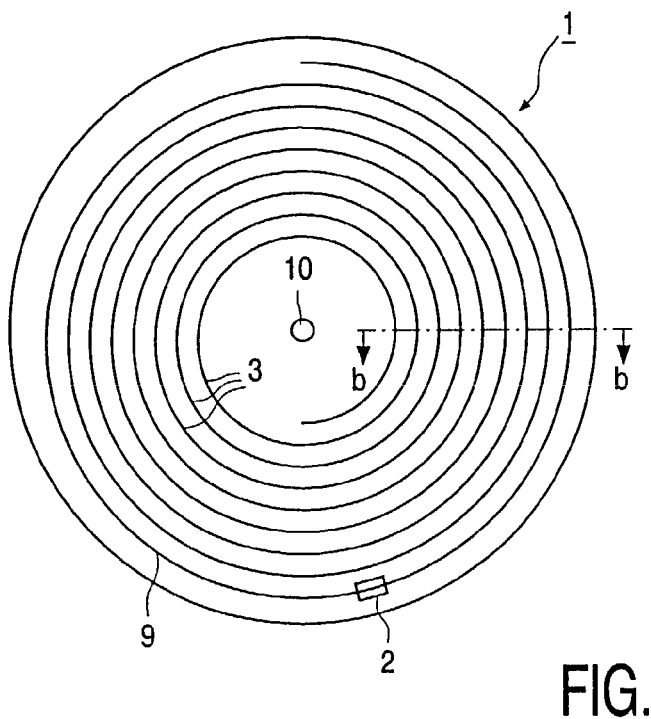
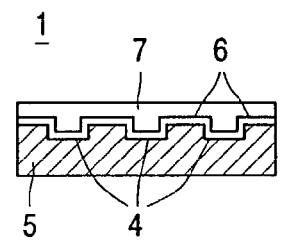
FIG. 1b
FIG. 1a
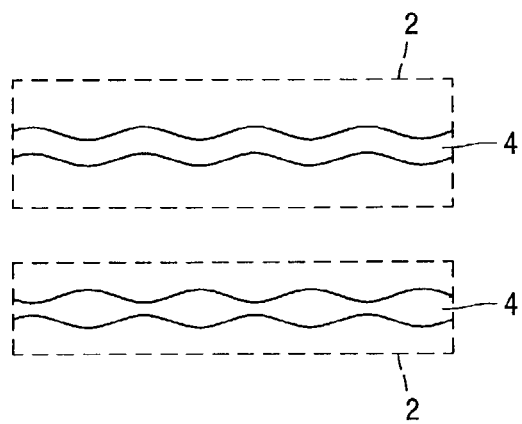
FIG. 1c
FIG. 1d

RECORD CARRIER HAVING A SERVO TRACK WITH POSITION INFORMATION IN ACCORDANCE WITH A MODULATION TYPE AND PERMANENT INFORMATION IN ACCORDANCE WITH A DIFFERENT MODULATION TYPE, AND APPARATUS FOR SCANNING THE RECORD CARRIER

BACKGROUND OF THE INVENTION

1. Field of the Invention

The invention relates to a record carrier comprising a servo track indicating an information track intended for recording information blocks represented by marks, this servo track having a periodic variation of a physical parameter at a predetermined frequency, and modulated parts for encoding position information according to a predetermined type of modulation.

The invention further relates to a recording and/or playback device comprising means for writing and/or reading information blocks in an information track on a record carrier that comprises a servo track indicating the information track, the recording and/or playback device comprising means for scanning the servo track and demodulation means for retrieving position information from a signal generated by a variation of a physical parameter of the servo track at a predetermined frequency, the servo track having modulated parts for the encoding position information according to a predetermined type of modulation.

The invention further relates to a method for manufacturing the record carrier.

2. Description of the Related Art

A record carrier and device for reading and/or writing information are known from International Patent Application No. WO 00/43996, corresponding to U.S. Pat. Nos. 6,538,982 and 6,765,861 (PHN 17323). The information to be recorded is encoded into an information signal which includes address codes and is subdivided in accordance with the address codes into information blocks. The record carrier is of a recordable type and has a servo track, usually called pre-groove, for causing servo signals to be generated when scanning the track. A physical parameter, e.g., the radial position, of the pre-groove periodically varies at a predetermined frequency constituting a so-called wobble. During the scanning of the track, this wobble leads to a variation of the radial tracking servo signals and a wobble signal can be generated. The wobble is modulated according to a type of modulation using phase modulation for encoding position information. The phase modulation or frequency modulation used for encoding digital position information is selected to minimally disturb the component of the predetermined frequency in the wobble signal, because that component is used to control the recording speed. Hence, a majority of the periodic variations needs to be non-modulated, i.e., having the zero crossings not shifted from the nominal positions. During recording, the position information is retrieved from the wobble signal and is used for positioning the information blocks by keeping a predefined relation between the address codes in the information blocks and the position information. Further, permanent data may be accommodated on the record carrier using the modulation type of the position information, this permanent data possibly comprising data on the parameters for writing data on the record carrier or management information.

A problem of the known system is that accommodating permanent data on the record carrier is limited by the available data capacity of the servo track.

SUMMARY OF THE INVENTION

It is an object of the invention to provide a record carrier and device in which large amounts of permanent data can easily be accommodated.

According to the invention, a record carrier as defined in the opening paragraph is characterized in that the record carrier comprises a management area in which the servo track comprises permanent data represented by further variations of said physical parameter, the further variations being in accordance with a different type of modulation. Further, the recording and/or playback device as described in the opening paragraph is characterized in that the device comprises further demodulation means of a different type for retrieving management data from a management area in which the servo track comprises the management data represented by further variations of said physical parameter, the further variations being in accordance with the different type of modulation.

The invention is based on the following recognition. The information density of the type of modulation used for position information is rather low. For example, in CD-R and DVD+RW recordable type of discs, some permanent data is multiplexed in the servo track using the modulation system of the position information. However, when a large amount of permanent data needs to be accommodated on the recordable disc, such would require a large part of the available servo track, and hence, a large access time would result for reading the permanent data. Alternatively, a separate area with read-only type of information, for example, encoded in pits and lands like on DVD-ROM, could be added to the recordable disc, resulting in a hybrid type of disc. However, such read-only area requires a separate production step for producing an area with readable marks with a depth equal to read-only type pressed marks. The inventors have seen that a different type of modulation of the same parameter used for position information provides the required higher data capacity in a limited amount of disc space. Advantageously, no additional production steps are needed, because the same parameter is modulated but in a different way. Further, in most cases, no additional detection circuits in the recorder or playback device are needed, only a modification of the detection function for detecting the modified type of modulation.

A further embodiment of the record carrier is characterized in that the predetermined type of modulation is a type of frequency or phase modulation of the periodic variation and/or the different type of modulation is direct digital modulation in which logical values of bits are represented by displacements of the servo track in transverse direction. The advantage is that the frequency or phase modulation has a limited effect on frequency component in the wobble signal, whereas the direct digital modulation has a high data rate, for example, when the bit frequency is chosen to be equal to the frequency of the periodic variation.

A further embodiment of the record carrier is characterized in that the direct digital modulation is a run-limited modulation (RLL). This has the advantage that a bit clock can be easily locked to the RLL data, because the maximum length of marks is limited. Using a minimal length of the marks of 1 bit clock period (usually called d=0 in the NRZI coding system) gives a high data rate.

BRIEF DESCRIPTION OF THE DRAWINGS

These and other aspects of the invention will be apparent from and elucidated further with reference to the embodiments described by way of example in the following description and with reference to the accompanying drawings, in which:

FIG. 1a shows a record carrier with a servo track (top view), FIG. 1b shows a servo track (cross section), FIG. 1c shows a wobble of a servo track (detail), and FIG. 1d shows a further wobble of a servo track (detail);

In the Figures, elements which correspond to elements already described have the same reference numerals.

DESCRIPTION OF THE PREFERRED EMBODIMENTS

Figure 2:
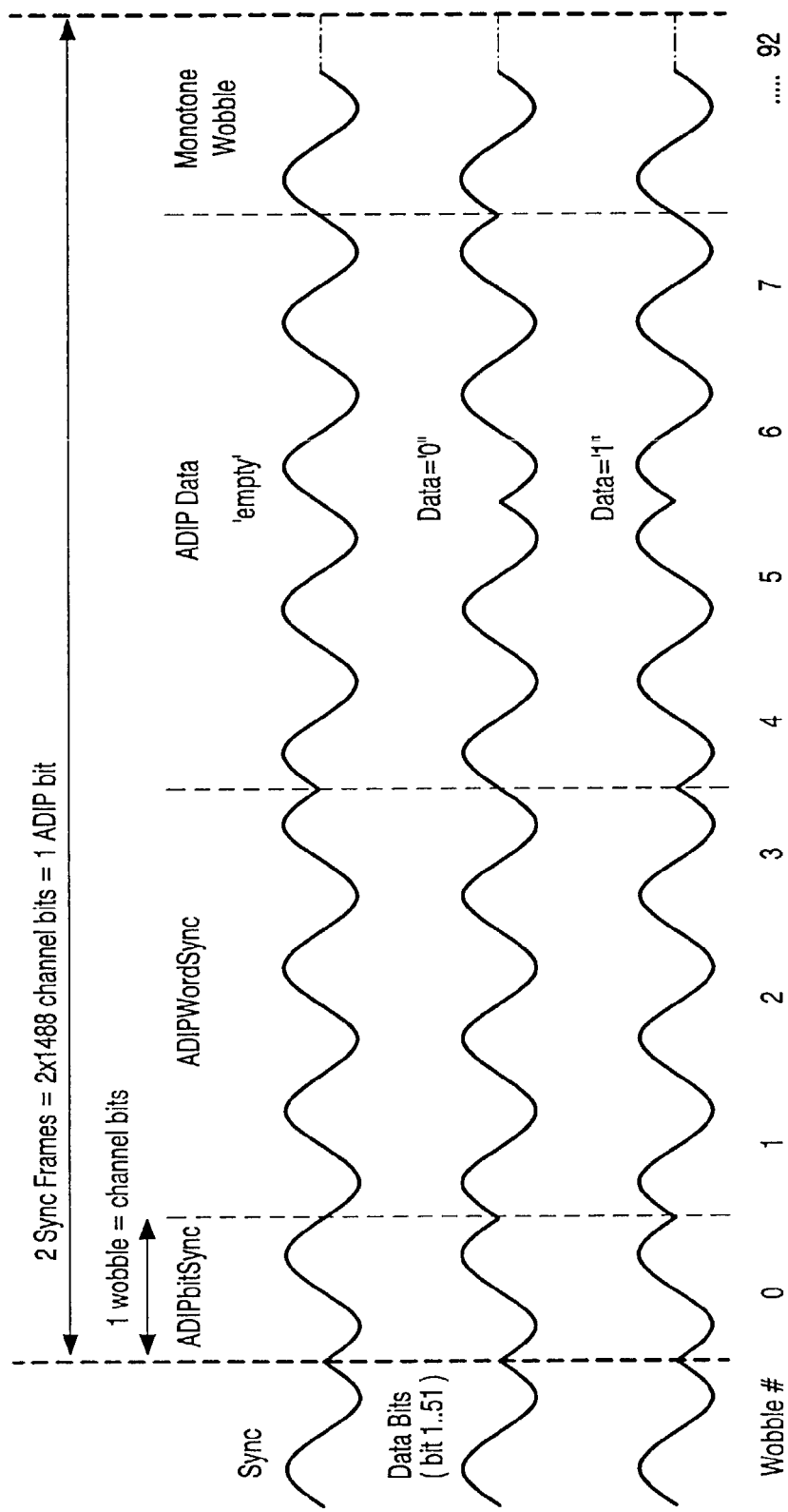
FIG. 2 shows bi-phase wobble modulation.

FIG. 1a shows a disc-shaped record carrier 1 provided with a track 9 intended for recording and a central hole 10. The track 9 is arranged in accordance with a spiral pattern of windings 3. FIG. 1b is a cross-section of the record carrier 1 taken on the line b—b in FIG. 1a, in which a transparent substrate 5 is provided with a recording layer 6 and a protective layer 7. The recording layer 6 may be optically writable, for example, via phase change, or magneto-optically writable by a device for writing information, such as the known CD-Rewritable or CD-Recordable. The recording layer may also be provided with information via a production process, in which first a master disc is made which is subsequently multiplied through pressing. The information is organized in information blocks and is represented by optically readable marks in the form of a succession of areas reflecting much radiation and little radiation such as, for example, a succession of pits of different lengths in a CD. In one embodiment, the track 9 on the record carrier of a rewritable type is indicated by a servo-pattern which is provided during manufacture of the blank record carrier. The servo-pattern is formed, for example, by a pre-groove 4 which enables a write head to follow the track 9 during scanning. The pre-groove 4 may be implemented as a deeper or a raised part, or as a material property deviating from its ambience. Alternatively, the servo-pattern may consist of an alternation of elevated and deeper windings, referred to as land and groove patterns, with a transition from land to groove or vice versa taking place per winding. FIGS. 1c and 1d show two examples of a periodical variation of a physical parameter of the pre-groove, called wobble. FIG. 1c shows variation of the lateral position, and FIG. 1d shows variation of the width. This wobble produces a wobble signal in a tracking servo-sensor. The wobble is, for example, frequency modulated, and position information, such as an address, a time code or winding information, is coded in the modulation. A description of a rewritable CD system which is provided with position information in such a way can be found in U.S. Pat. No. 4,901,300 (PHN 12.398). A servo-pattern may also consist of, for example, regularly distributed sub-patterns which periodically cause tracking signals. Further, the servo-pattern may include modifications of the land area beside the pre-groove, e.g., an undulating pre-groove having land pre-pits in a specific pattern for encoding position information, like in DVD-RW.

The variation of the servo track includes relatively large parts of monotone wobble, so called non-modulated parts. Further the servo track has relatively short parts where the frequency and/or phase of the wobble deviates from the predetermined wobble frequency, called modulated parts. In this document, any servo-pattern of a periodic nature in combination with any additional elements encoding information is referred to as a servo track having a periodic variation of a physical parameter at a predetermined frequency, or wobble, that has modulated parts.

FIG. 2 shows bi-phase wobble modulation. An upper trace shows the wobble modulation for a word sync pattern, a second and third trace show the wobble modulations for data bits of the address, the total modulation being called Address In Pre-groove (ADIP). Predetermined phase patterns are used for indicating a synchronizing symbol (ADIP bit sync) and a synchronization of the full address word (ADIP word sync), and for the respective data bits (ADIP Data='0', and ADIP data='1'). The ADIP bit sync is indicated by a single inverted wobble (wobble # 0). The ADIP word sync is indicated by three inverted wobbles directly following the ADIP bit sync, whereas data bits have non-inverted wobbles in this area (wobble # 1 to 3). An ADIP Data area comprises a number of wobble periods assigned to represent one data bit, in the Figure the wobble periods numbered 4 up to 7 (=wobble # 4 to 7). The wobble phase in the first half of the ADIP Data area is inverse to the wobble phase in the second half of the area. As such, each bit is represented by two sub-areas having different phases of the wobble, i.e., called bi-phase. Data bits are modulated as follows: ADIP Data='0' is represented by 2 non-inverted wobbles followed by two inverted wobbles, and ADIP data='1', vice versa. In this embodiment, the modulation for data bits is fully symmetrical, giving equal error probability for both data bit values. However, other combinations of wobbles and inverted wobbles, or other phase values may be used. In an embodiment, a predetermined modulation is used after a ADIP Word Sync, indicating 'empty', instead of a data bit. Monotone wobbles may be used after the first data bit, or further data bits may be encoded thereafter. Preferably, a large majority of the wobbles is not modulated (i.e., has the nominal phase) for ensuring an easy lock and a stable output of a PLL in a detector; in this embodiment, the 8 possibly modulated wobbles are followed by 85 not modulated (i.e., monotone) wobbles (wobble # 8 to 92). The output frequency of the PLL has to be as stable as possible, because during writing, the write clock is derived from the PLL output.

Figure 3:
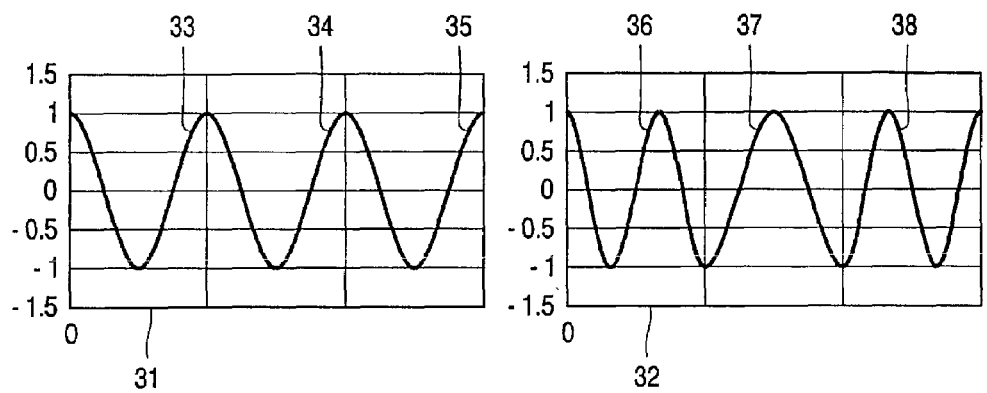
FIG. 3 shows MSK wobble modulation.

FIG. 3 shows MSK wobble modulation. The Minimum Shift Keying (MSK) modulation uses a first pattern 31 for transferring a first bit value and a second pattern 32 for transferring a second bit value. Further combinations of the patterns 31, 32 may be used to transfer synchronization information. Each MSK pattern has a central part of at least one full wobble period, in the first pattern, the central part 34 is non-inverted, while in the second pattern the central part 37 is inverted. Each MSK pattern further has a starting part and an ending part. The left MSK pattern has a starting part 33 and an ending part 35 just being a single wobble period. The right MSK pattern has a starting part 36, which inverts the phase by having a frequency of 1.5 times the wobble frequency, i.e., by having 3 half sine periods within one wobble frequency period. The ending part is similar to re-invert the phase to the non-inverted state. Detection of MSK data bits is primarily based on the detection of the central part, because both central parts exhibit the maximum difference between the two patterns. In addition, the difference of the not modulated starting part 33 and modulated starting part 36, and the not modulated ending part 35 and modulated ending part 38 can be exploited for detection, the total length of these differences is estimated to have 50% of effective strength of detection when compared to the central part. The MSK encoding can be used to encode address bits in a pre-groove wobble, but the pre-groove wobble needs to be not modulated for the majority of wobble periods. The large majority of not modulated wobbles is needed for reliably controlling the rotation speed of the disc and/or the write clock of the recording process.

On re-writable optical discs, a need may arise to store a substantial amount of permanent information, e.g., for copy-protection and digital-rights-management purposes. Examples are media key blocks (MKB) and enabling key blocks (EKB) that are typically a few MBs large. The permanent information should be pre-embossed on the disc. A problem arises in groove-only formats in which the grooves are made shallow to optimize the performance of the phase-change recording. If one then wants to store the permanent information on the disc by straightforwardly embossing pits, these pits will be as shallow as the grooves and will consequently generate only a very small signal that is difficult or even impossible to detect using standard methods. One solution is to make the pits deeper than the grooves to enlarge the signal, but this is difficult and expensive for manufacturing. Another option is to detect the shallow pits using a tangential push-pull channel that is more sensitive for shallow structures than the conventional central-aperture channel. The detection of this channel is, however, not standard in optical recording and it is unclear how realistic this option is.

The solution proposed is to enhance the radial push-pull (RPP) channel for storing the permanent data on a re-writable disc. Also, the RPP detection system already present in recording systems using a pre-groove is more sensitive for shallow structures than the central-aperture channel. The RPP channel is already available in drives for wobble detection. Also, the same mastering facilities that are used to master the wobble can be applied for embossing the permanent information. Any type of modulation which encodes data at a sufficient rate may be used in the enhanced RPP channel. On the record carrier, the pre-groove has a part for storing data which only has wobble modulation for encoding address bits, for example, as described with reference to FIG. 2 or FIG. 3 above. In addition, the record carrier has a management area where the pre-groove is provided with the enhanced modulation. The enhanced modulation may be of a suitable type, which is different from the low data density modulation used for encoding the address data. To be able to read back the permanent information with sufficient rate, the linear density should be sufficiently high. Storing this permanent information in the same way in the wobble as the address information is thus not an option. A higher wobble frequency is an option which improves the rate, but only proportional to the increase in frequency. It is to be noted that the management area may be reserved for storing the permanent data only, i.e., by not recording user data in that area. In that case, the drive will not be allowed to write in the area with the RLL wobble. Hence, there is more freedom in choosing a modulation type, because there is no interference with the user data. A suitable efficient type of modulation is direct digital modulation described below.

Figure 4:
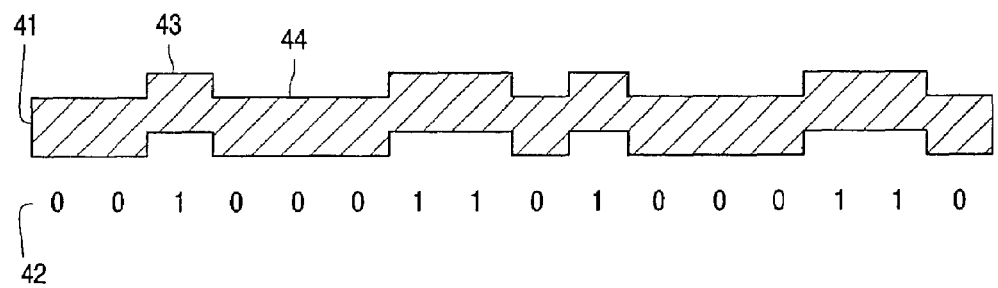
FIG. 4 shows direct digital modulation.

FIG. 4 shows direct digital modulation. A stream of data bits 42 is shown schematically below the modulated pre-groove 41, where the hatched area represents a groove. The direct digital modulated pre-groove 41 is modulated in the following way: move the track in transverse direction to one side, as shown in area 44, to represent a '0' and to the other side, as shown in area 43, to represent a '1'. Alternatively, a transition from one side to the other could represent a '1' and no transition a '0'. In an embodiment, a run-length limited (RLL) code is used to modulated the permanent data. A RLL code has a minimum length d of consecutive bit cells of a same value. The constraint d=0 might be preferable to achieve the highest density since the RPP channel is not limited by optical diffraction. The signal detected in RPP is then similar to the shape of the wobble and can be detected using circuits that are very similar to the circuits used for the detection of the high-frequency data from the central-aperture channel. In an embodiment, crosstalk between neighboring tracks in the management area is reduced. This may be achieved by alternating tracks with and without data modulation. In an embodiment, the track pitch in the management region can be chosen different from the track pitch in the re-writable areas to optimize the push-pull signal and thereby the wobble signal.

In a practical embodiment, the amplitude of the transverse modulation is, for example, 10 to 40 nm, and the length of one bit may be equal to 320 nm to 640 nm. The length of the bit may be chosen to correspond to a fixed number of bit-lengths T of the user data, e.g., 4T or 8T. Advantageously, for the RLL coding, the d, k constraints may be selected as d=1 and k=7 using the same RLL coding as the main user data, and the bit-length as 2T, resulting in a minimum length of 4T of a mark in the resulting direct digital modulation.

Figure 5:
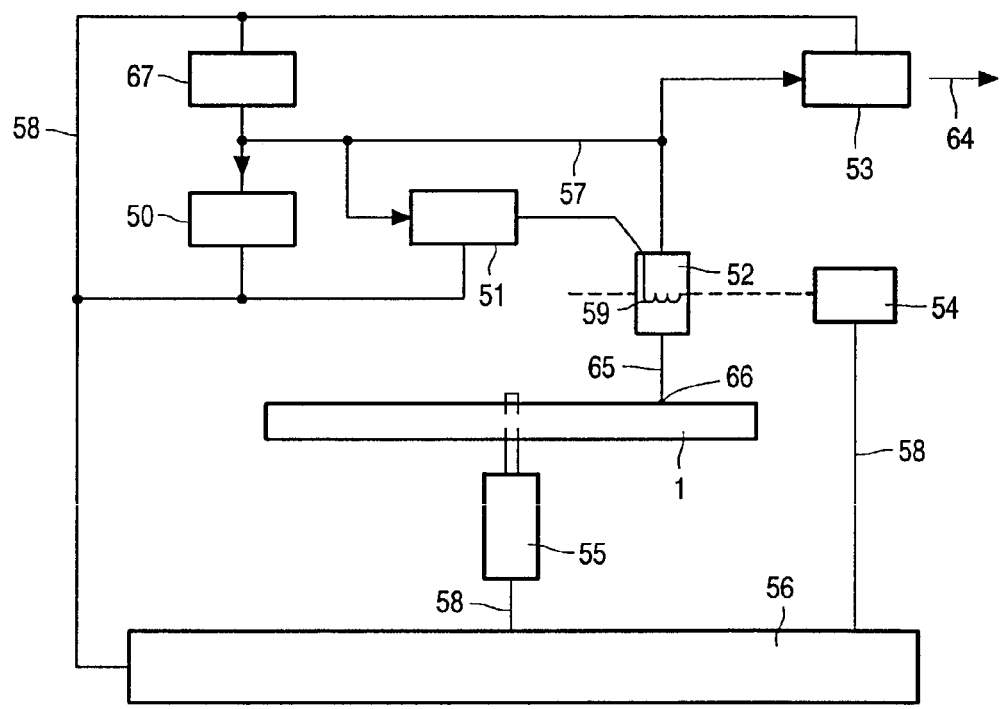
FIG. 5 shows a device for reading information blocks.

FIG. 5 shows a reading device for scanning a record carrier 1. Writing and reading of information on optical discs and formatting, error correcting and channel coding rules, are well-known in the art, e.g., from the CD system. The apparatus of FIG. 5 is arranged for reading the record carrier 1, this record carrier being identical to the record carriers shown in FIG. 1. The device is provided with a read head 52 for scanning the track on the record carrier and read control means comprising drive unit 55 for rotating the record carrier 1, a read circuit 53, for example, comprising a channel decoder and an error corrector, tracking unit 51 and a system control unit 56. The read head comprises optical elements of the usual type for generating a radiation spot 66 focused on a track of the recording layer of the record carrier via a radiation beam 65 guided through optical elements. The radiation beam 65 is generated by a radiation source, e.g., a laser diode. The read head further comprises a focusing actuator for focusing the radiation beam 65 on the recording layer and a tracking actuator 59 for fine positioning of the spot 66 in a radial direction on the center of the track. The apparatus has a positioning unit 54 for coarsely positioning the read head 52 in the radial direction on the track. The tracking actuator 59 may comprise coils for radially moving an optical element, or may be arranged for changing the angle of a reflecting element on a movable part of the read head or on a part on a fixed position in the case part of the optical system is mounted on a fixed position. The radiation reflected by the recording layer is detected by a detector of a usual type, e.g., a four-quadrant diode, for generating detector signals 57 including a read signal, a tracking error and a focusing error signal. The tracking unit 51 is coupled to the read head for receiving the tracking error signal from the read head and controlling the tracking actuator 59. During reading, the read signal is converted into output information, indicated by arrow 64, in the read circuit 53. The apparatus is provided with a demodulator 50 for detecting and retrieving the address information from the wobble signal included in the detector signals 57 when scanning the servo track of the record carrier. The device is further provided with a system control unit 56 for receiving commands from a controlling computer system or from a user, and for controlling the apparatus via control lines 58, e.g., a system bus connected to the drive unit 55, the positioning unit 54, the demodulator 50, the tracking unit 51 and the read circuit 53. To this end, the system control unit comprises control circuitry, for example, a microprocessor, a program memory and control gates, for performing the procedures described below. The system control unit 56 may also be implemented as a state machine in logic circuits. The read device is arranged for reading a disc having tracks having a periodic variation, e.g., a continuous wobble. The read control unit is arranged for detecting the periodic variations and for reading, in dependence thereon, a predetermined amount of data from the track. In particular, the demodulator 50 is arranged for reading position information from the modulated signal derived from the modulated wobble. The demodulator 50 has a detection unit for detecting modulated wobbles starting at a predefined synchronization point in the wobble signal. The demodulator further has a word detection unit for retrieving the words of address information. The beginning of such a word is detected from a word synchronization signal after a long sequence of non-modulated wobbles. The occurrence and value of a data bit is detected based on the modulated wobbles. Further, the device has a second demodulator 67 of a different type for demodulating the permanent data from the management area. The demodulation function corresponds to the type of modulation used on the record carrier, e.g., the direct digital modulation described with reference to FIG. 4. Under control of the system control unit 56, the head 52 is positioned above the management area of the record carrier as described above with reference to FIGS. 3 and 4. The permanent data is demodulated according to encoding scheme used, for example, the RLL encoding.

Figure 6:
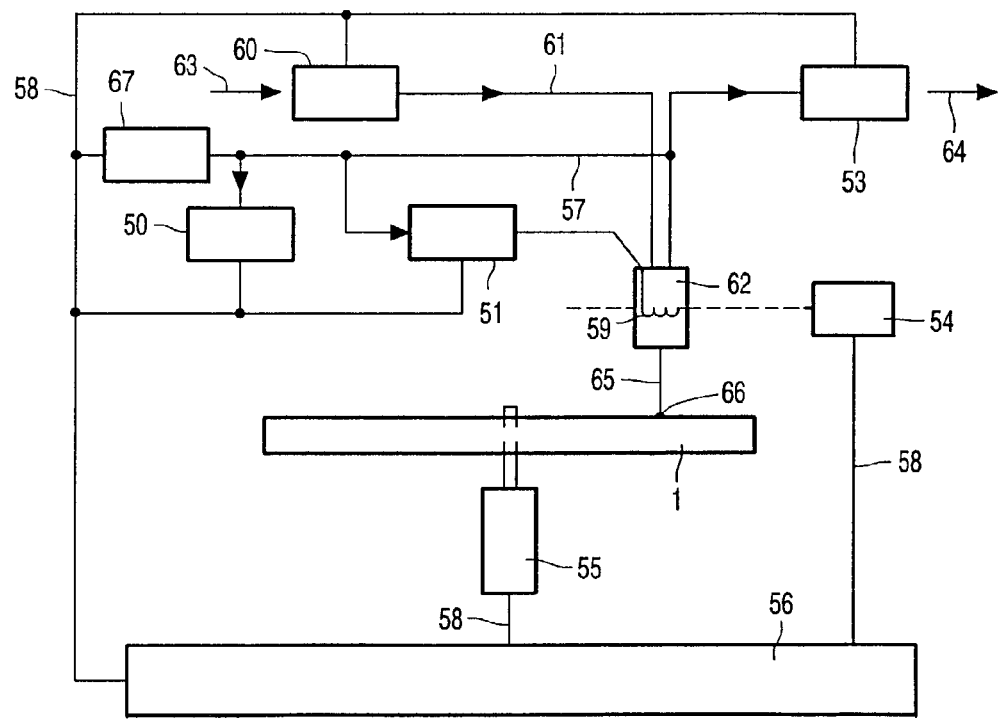
FIG. 6 shows a device for writing information blocks.

FIG. 6 shows a device for writing information on a record carrier according to the invention of a type which is (re) writable in, for example, a magneto-optical or optical manner (via phase change or dye) by means of a beam 65 of electromagnetic radiation. The device is also equipped for reading and comprises the same elements as the apparatus for reading described above with FIG. 5, except that it has a write/read head 62 and recording control means comprising the same elements as the read control means, except for a write circuit 60 that comprises, for example, a formatter, an error encoder and a channel encoder. The write/read head 62 has the same function as the read head 52 together with a write function and is coupled to the write circuit 60. The information presented to the input of the write circuit 60 (indicated by the arrow 63) is distributed over logical and physical sectors according to formatting and encoding rules and converted into a write signal 61 for the write/read head 62. The system control unit 56 is arranged for controlling the write circuit 60 and for performing the position information recovery and positioning procedure as described above for the reading apparatus. During the writing operation, marks representing the information are formed on the record carrier. The recording control means is arranged for detecting the periodic variations, for example, by locking a phase-locked loop to the periodicity thereof. The demodulator 50 is described above with reference to FIG. 5.

Although the invention has been explained by embodiments using a wobble modulation, any other suitable parameter of the track may be modulated, e.g., the track width. Also, for the record carrier, an optical disc has been described, but other media, such as a magnetic disc or tape, may be used. It is noted that in this document, the word 'comprising' does not exclude the presence of elements or steps other than those listed, and the word 'a' or 'an' preceding an element does not exclude the presence of a plurality of such elements, that any reference signs do not limit the scope of the claims, that the invention may be implemented by means of both hardware and software, and that several 'means' may be represented by the same item of hardware. Further, the scope of the invention is not limited to the embodiments, and the invention lies in each and every novel feature or combination of features described above.

The invention claimed is:

1. A record carrier comprising a servo track indicating an information track intended for recording information blocks represented by marks, said servo track having a periodic variation of a physical parameter at a predetermined frequency and modulated parts for encoding position information according to a predetermined type of modulation, characterized in that the record carrier further comprises a management area in which the servo track comprises permanent data represented by further variations of said physical parameter, the further variations being modulated in accordance with a type of modulation different from said predetermined type of modulation.

2. The record carrier as claimed in claim 1, wherein the predetermined type of modulation is a type of frequency or phase modulation of the periodic variation and/or the different type of modulation is direct digital modulation in which logical values of bits are represented by displacements of the servo track in a transverse direction.

3. The record carrier as claimed in claim 2, wherein the direct digital modulation is a run-length limited modulation (RLL).

4. The record carrier as claimed in claim 1, wherein the permanent data comprises key blocks for copy-protection and/or digital rights management.

5. The record carrier as claimed in claim 1, wherein the management area is not intended for recording information.

6. A record carrier comprising a servo track indicating an information track intended for recording information blocks represented by marks, said servo track having a periodic variation of a physical parameter at a predetermined frequency and modulated parts for encoding position information according to a predetermined type of modulation, characterized in that the record carrier further comprises a management area in which the servo track comprises permanent data represented by further variations of said physical parameter, the further variations being modulated in accordance with a type of modulation different from said predetermined type of modulation, wherein the management area has a track pitch between neighboring tracks larger than the track pitch in the area of the record carrier covered by the servo track indicating the information track intended for recording information blocks.

7. A recording and/or playback device comprising means for writing and/or reading information blocks in an information track on a record carrier having a servo track (4) indicating the information track (9), said recording and/or playback device comprises means for scanning the servo track, and demodulation means for retrieving position information from a signal generated by a variation of a physical parameter of the servo track at a predetermined frequency, said servo track having modulated parts for encoding position information according to a predetermined type of modulation, characterized in that the recording and/or playback device further comprises further demodulation means of a type different from said demodulation means for retrieving management data from a management area in which the servo track comprises the management data represented by further variations of said physical parameter, the further variations being modulated in accordance with the different type of modulation.

8. The recording and/or playback device as claimed in claim 7, wherein the demodulation means demodulates frequency or phase modulation of the periodic variation and/or the further demodulation means demodulates direct digital modulation in which logical values of bits are represented by displacements of the servo track in transverse direction.

9. The recording and/or playback device as claimed in claim 7, wherein the further demodulation means decodes run-length limited modulation (RLL).

10. A method of manufacturing a record carrier, in which the record carrier is provided with a servo track indicating an information track intended for recording information blocks, said servo track being provided with a variation of a physical parameter at a predetermined frequency and modulated parts for encoding position information according to a predetermined type of modulation, characterized in that the record carrier comprises a management area in which the servo track comprises management data represented by further variations of said physical parameter, the further variations being modulated in accordance with a type of modulation different from said predetermined type of modulation.

* * * * *